UNITED STATES PATENT OFFICE 2,673,884

PRODUCTION OF FLUORO-OLEFINS

Charles L. Thomas, Winnetka, Ill.

No Drawing. Application December 6, 1951,
Serial No. 260,322

6 Claims. (Cl. 260—653)

My invention relates to a method for making fluoro-olefins. More specifically, my invention relates to a method for making fluoro-olefins without the use of elemental fluorine.

In the halogen series, there are well known relations between the free halogens and the ones which will replace others from their salts. Thus, chlorine will displace bromine or iodine from its salts, but bromine will not displace chlorine from its salts and neither chlorine, bromine nor iodine will displace fluorine from its salts.

In my invention I am able to cause reaction in a way that gives, in part, the appearance of the liberation of fluorine by chlorine. In its simplest form, I can represent my method by the following equation:

$$C_2H_4 + Cl_2 + NaF \rightarrow ClH_2C-CH_2F + NaCl$$

The sodium fluoride is dissolved in water and the ethylene and chlorine are passed in as gases. The chlorofluoroethane is recovered as a vapor and passed over alkali at elevated temperatures to produce vinyl fluoride. The vinyl fluoride is useful as monomer for producing resins and plastics, either alone or with other monomers.

In one embodiment, my invention comprises reacting an olefinic compound with chlorine in an aqueous medium containing fluoride ions and dehydrochlorinating the resulting product to form a fluoro-olefin.

The ideal source of fluoride ions is silver fluoride since it is soluble in water and the silver chloride formed from it in the reaction is insoluble. For economic reasons it is not ordinarily possible to use silver fluoride. In its place I have found that water soluble metallic fluorides, such as sodium fluoride, sodium acid fluoride, potassium fluoride, potassium acid fluoride, and hydrofluoric acid are excellent sources of fluoride ions for my process. The other alkali metal fluorides and acid fluorides, such as those of lithium, rubidium, and caesium are usable, but, again for economic reasons, are not ordinarily employed. Even though it is insoluble in water, finely divided fluorite (native calcium fluoride) may be used as a suspension. It acts as a source of fluoride ion, although the concentration of fluoride ion at any given moment may be relatively low.

As the reaction proceeds, it is clear from the equation given above that chloride ions build up in the aqueous solution. As this concentration increases, the yield of the chloro-fluoro-compound decreases and the yield of the dichloro compound increases. When the dichloro compound becomes the major product, the process is stopped and a new batch started.

*Example I.*—A saturated solution of sodium acid fluoride in water was prepared. Mole for mole quantities of ethylene and chlorine were passed separately into the solution. The 1-chloro-2-fluoroethane was recovered and passed over soda lime at 400° C. The vinyl fluoride was collected in a Dry Ice trap. The yield was 58% of the theoretical.

After the reaction had proceeded until about one half of the sodium acid fluoride was used, the yield of ethylene dichloride became larger than was desired. The acid fluoride was neutralized with caustic to form sodium fluoride, most of which was precipitated. The precipitate was filtered and treated with hydrofluoric acid to form more sodium acid fluoride for a later batch.

*Example II.*—A good grade of fluorite was pulverized to minus 300 mesh. This was mixed with water to form a thin slurry. A stream of ethylene gas and a stream of chlorine gas were passed into the slurry. The 1-chloro-2-fluoroethane was recovered and dehydrochlorinated as described above. As the reaction proceeds, calcium chloride builds up in solution. This causes an increase in the formation of ethylene dichloride. To keep this at a minimum, a part of the aqueous suspension was removed continuously and the solid calcium fluoride separated from the liquor. The liquor was discarded while the solid was mixed with fresh water and continuously returned to the reactor. Fresh fluorite was added as needed.

Besides ethylene, I have found that propylene and the butylenes react. Mixed amylenes will also react but I have not yet identified the products formed. They do contain appreciable quantities of fluorine, so my process must be occurring.

Besides the simple olefins, I have found that 1,3-butadiene will react but, again, I have not identified the products except to determine that they contain fluorine.

Styrene, cyclohexene, turpentine, allyl alcohol and maleic acid all react and the products contain fluorine.

When studying the dehydrohalogenation, I thought at first that the fluorine would be removed selectively and that chloro-olefins would be the main products. Instead, the dehydrohalogenation is remarkably selective towards dehydrochlorination to form the fluoro-olefin. Conventional dehydrochlorination agents, such as lime, soda lime, limestone, etc., may be employed.

I claim as my invention:

1. A method for making fluoro-olefins which comprises, bringing together chlorine and an olefin in an aqueous system containing fluoride ions, and dehydrochlorinating the chloro-fluoro-compound formed as an intermediate.

2. A method for making fluoro-olefins which comprises, bringing together chlorine and an olefinic hydrocarbon in an aqueous system containing fluoride ions, and dehydrochlorinating the chloro-fluoro-compound formed as an intermediate.

3. A method for making fluoro-olefins which comprises, reacting chlorine and an olefin with fluoride ions contained in an aqueous solution of sodium fluoride, to form a chloro-fluoro-compound, and dehydrochlorinating said intermediate compound.

4. A method for making fluoro-olefins which comprises, reacting chlorine and an olefin with fluoride ions contained in an aqueous solution of sodium acid fluoride, to form a chloro-fluoro-compound, and dehydrochlorinating said intermediate compound.

5. A method for making vinyl fluoride which comprises, reacting chlorine and ethylene with fluoride ions contained in an aqueous solution to form chloro-fluoro-ethane, and dehydrochlorinating said ethane to form vinyl fluoride.

6. A method for making vinyl fluoride which comprises, reacting chlorine and ethylene with fluoride ions contained in an aqueous solution of sodium acid fluoride to form chloro-fluoro-ethane, and dehydrochlorinating said ethane to form vinyl fluoride.

CHARLES L. THOMAS.

References Cited in the file of this patent

UNITED STATES PATENTS

| Number | Name | Date |
|---|---|---|
| 1,914,135 | Lacy | June 13, 1933 |
| 2,007,208 | Midgley, Jr. et al. | July 9, 1935 |
| 2,344,061 | Renoll | Mar. 14, 1944 |
| 2,401,897 | Benning et al. | June 11, 1946 |